US008854485B1

(12) United States Patent
Desai et al.

(10) Patent No.: US 8,854,485 B1
(45) Date of Patent: Oct. 7, 2014

(54) METHODS AND SYSTEMS FOR PROVIDING FUNCTIONALITY OF AN INTERFACE TO INCLUDE AN ARTIFICIAL HORIZON

(75) Inventors: Munjal Desai, Mountain View, CA (US); Ryan Hickman, Mountain View, CA (US); Thor Lewis, Mountain View, CA (US); Damon Kohler, Mountain View, CA (US)

(73) Assignee: Google Inc., Mountain View, CA (US)

( * ) Notice: Subject to any disclaimer, the term of this patent is extended or adjusted under 35 U.S.C. 154(b) by 573 days.

(21) Appl. No.: 13/213,678

(22) Filed: Aug. 19, 2011

(51) Int. Cl.
*H04N 5/232* (2006.01)
*H04N 7/18* (2006.01)

(52) U.S. Cl.
USPC ........................................ 348/211.8; 348/143

(58) Field of Classification Search
USPC ......... 348/211.4, 211.8, 211.99, 143, 333.02; 700/245
See application file for complete search history.

(56) References Cited

U.S. PATENT DOCUMENTS

| 7,535,493 | B2* | 5/2009 | Morita ....................... 348/211.8 |
| 8,401,275 | B2* | 3/2013 | Wang et al. .................. 382/153 |
| 2003/0216834 | A1* | 11/2003 | Allard ........................... 700/245 |
| 2005/0036036 | A1* | 2/2005 | Stevenson et al. ....... 348/211.99 |
| 2005/0071046 | A1* | 3/2005 | Miyazaki et al. ............. 700/245 |
| 2010/0073490 | A1* | 3/2010 | Wang et al. .............. 348/207.11 |
| 2011/0025861 | A1* | 2/2011 | Dumm ..................... 348/207.11 |

* cited by examiner

*Primary Examiner* — Nhan T Tran
(74) *Attorney, Agent, or Firm* — McDonnell Boehnen Hulbert & Berghoff LLP (57) ABSTRACT

Methods and systems for providing functionality of an interface to include an artificial horizon are provided. In one example, a method includes receiving information indicating a range of motion of a camera on a device, and providing an interface on a second device remote from the device. The interface may be configured to receive an input indicating a command for an orientation of the camera on the device. The method may further include based on the information indicating the range of motion of the camera, providing an artificial horizon at a fixed position on the interface that indicates the range of motion of the camera on either side of the artificial horizon. The fixed position of the artificial horizon may be associated with an orientation of the camera having a tilt value of about zero or having a pan value of about zero.

19 Claims, 8 Drawing Sheets

METHODS AND SYSTEMS FOR PROVIDING FUNCTIONALITY OF AN INTERFACE TO INCLUDE AN ARTIFICIAL HORIZON

BACKGROUND

In industrial design, a user interface provides functionality to enable interaction between humans and machines. A goal of interaction between a human and a machine at the user interface is generally effective operation and control of the machine, and feedback from the machine that aids the user in making operational decisions. Examples of user interfaces include interactive aspects of computer operating systems, hand tools, heavy machinery operator controls, process controls, etc.

Design considerations applicable when creating user interfaces may be related to or involve ergonomics and psychology. For example, user interfaces can be designed so as to be associated with the functionalities of a product, such as to enable intended uses of the product by users with efficiency, effectiveness, and satisfaction, taking into account requirements from context of use.

A user interface includes hardware and software components. User interfaces exist for various systems, and provide a manner to receive inputs allowing users to manipulate a system, and/or receive outputs allowing the system to indicate effects of the users' manipulation. Many types of user interfaces exist. One example user interface includes a graphical user interface (GUI) that is configured to accept inputs via devices such as a computer keyboard and mouse and provide graphical outputs on a display. Another example user interface includes touchscreens that include displays that accept input by touch of fingers or a stylus.

SUMMARY

This disclosure may disclose, inter alia, methods and systems for providing functionality of an interface to include an artificial horizon.

In one example, a method is provided that comprises receiving information indicating a range of motion of a camera on a device, and providing an interface on a second device remote from the device. The interface may be configured to receive an input indicating a command for an orientation of the camera on the device. The method may also comprise based on the information indicating the range of motion of the camera, providing an artificial horizon at a fixed position on the interface that indicates the range of motion of the camera on either side of the artificial horizon. The fixed position of the artificial horizon may be associated with an orientation of the camera having a tilt value of about zero or having a pan value of about zero.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In one example, a non-transitory computer readable medium having stored thereon instructions executable by a computing device to cause the computing device to perform functions is provided. The functions comprise receiving information indicating a range of motion of a camera on a device, and providing an interface on the computing device. The interface may be configured to receive an input indicating a command for an orientation of the camera on the device. The functions may also comprise based on the information indicating the range of motion of the camera, providing an artificial horizon at a fixed position on the interface that indicates the range of motion of the camera on either side of the artificial horizon. The fixed position of the artificial horizon may be associated with an orientation of the camera having a tilt value of about zero or having a pan value of about zero.

In addition, circuitry may be provided that is wired to perform logical functions in any processes or methods described herein.

In still further examples, any type of devices may be used or configured to perform logical functions in any processes or methods described herein.

In one example, a device is provided that comprises a processor and memory including instructions stored therein executable by the processor to perform functions. The functions may comprise receiving information indicating a range of motion of a camera on a device, and providing an interface. The interface may be configured to receive an input indicating a command for an orientation of the camera on the device. The functions may further comprise based on the information indicating the range of motion of the camera, providing an artificial horizon at a fixed position on the interface that indicates the range of motion of the camera on either side of the artificial horizon. The fixed position of the artificial horizon is associated with an orientation of the camera having a tilt value of about zero or having a pan value of about zero.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for providing functionality of an interface to include an artificial horizon are provided. In one example, a method includes receiving information indicating a range of motion of a camera on a device, and providing an interface on a second device remote from the device. The interface may be configured to receive an input indicating a command for an orientation of the camera on the device. The method may further include based on the information indicating the range of motion of the camera, providing an artificial horizon at a fixed position on the interface that indicates the range of motion of the camera on either side of the artificial horizon. The fixed position of the artificial horizon may be associated with an orientation of the camera having a tilt value of about zero or having a pan value of about zero.

Figure 1:
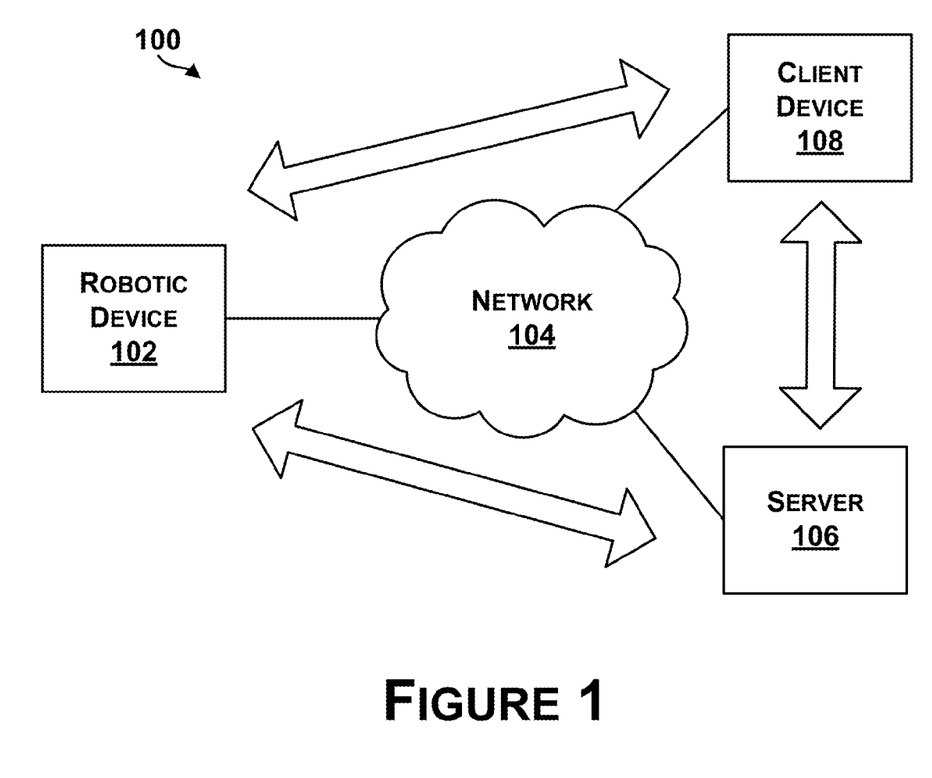
FIG. 1 is an example system for generating and modifying a view of a robotic device.

Referring now to the figures, FIG. 1 is an example system 100 for generating and modifying a view of a robotic device, and for controlling operation of the robotic device. The system 100 includes a robotic device 102 coupled to a network 104, and a server 106 and a client device 108 also coupled to the network 104. The robotic device 102 may further be coupled directly (or indirectly) to the server 106 and the client device 108 as shown. The system 100 may include more or fewer components, and each of the robotic device 102, the server 106, and the client device 108 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1.

The system 100 may enable cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example. Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

The system 100 includes a number of devices coupled to or configured to be capable of communicating with the network 104. Of course, more or fewer client devices may be coupled to the network 104. In addition, different types of devices may be coupled to the network 104. For example, any of the devices may generally comprise a display system, memory, and a processor.

Any of the devices shown in FIG. 1 may be coupled to the network 104 or to each other using wired or wireless communications. For example, communication links between the network 104 and devices may include wired connections, such as a serial or parallel bus. Communication links may also be wireless links, which may include Bluetooth, IEEE 802.11 (IEEE 802.11 may refer to IEEE 802.11-2007, IEEE 802.11n-2009, or any other IEEE 802.11 revision), or other wireless based communication links. In other examples, the system 100 may include access points through which the devices may communicate with the network 104. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the robotic device 102, the server 106, and the client device 108 may include a wired or wireless network interface through which the devices can connect to the network 104 (or access points). As an example, the devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

The network 104 may represent a networked computer architecture, and in one example, the network 104 represents a queue for handling requests from client devices. The network 104 may further include any of a local area network (LAN), wide area network (WAN), wireless network (Wi-Fi), or Internet, for example.

The server 106 may be a component coupled to the network 104 (as shown), or a component of the network 106 depending on a configuration of the system 100. The server 106 may include a processor and memory including instructions executable by the processor to perform functions as described herein.

The client device 108 may include any type of computing device (e.g., PC, laptop computer, etc.), or any type of mobile computing device (e.g., laptop, mobile telephone, cellular telephone, etc.). The client device 108 may include a processor and memory including instructions executable by the processor to perform functions as described herein.

The robotic device 102 may comprise any computing device that may include connection abilities to the network 104 and that has an actuation capability (e.g., electromechanical capabilities). A robotic device may further be a combination of computing devices. In some examples, the robotic device 102 may collect data and upload the data to the network 104. The network 104 may be configured to perform calculations or analysis on the data and return processed data to the robotic device 102.

Any of the client devices may include additional components. For example, the robotic device 102 may include one or more sensors, such as a gyroscope, an accelerometer, or distance sensors to measure movement of the robotic device 102. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the robotic device 102, the server 106, and the client device 108 may include an integrated user-interface (UI) that allows a user to interact with the device. For example, the robotic device 102 may include various buttons and/or a touchscreen interface that allow a user to provide input. As another example, the robotic device 102 may include a microphone configured to receive voice commands from a user. Furthermore, the robotic device 102 may include one or more interfaces that allow various types of user-interface devices to be connected to the robotic device 102.

Figure 2A:
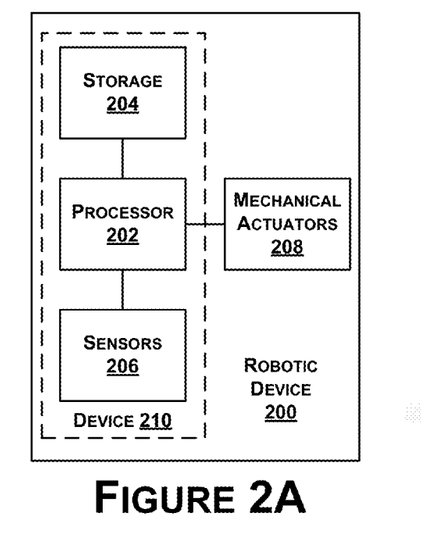
FIG. 2A-2C are example illustrations of robotic devices.

FIG. 2A illustrates an example robotic device 200. In one example, the robotic device 200 is configured as a robot. In some examples, a robot may contain computer hardware, such as a processor 202, memory or data storage 204, and one or more sensors 206. For example, a robot controller (e.g., processor 202, computing system, and sensors 206) may all be custom designed for a specific robot. The robot may have a link to access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robotic device 200 and storing program instructions. The processor 202 may be coupled to the storage 204 and may be configured to control the robotic device 200 based on the program instructions. The processor 202 may also be able to interpret data from the various sensors 206 on the robot. Example sensors may include a camera, smoke sensors, light sensors, radio sensors, infrared sensors, microphones, speakers, gyroscope, accelerometer, distance sensors, a camera, radar, capacitive sensors and touch sensors, etc. Example distance sensors include infrared ranging sensors, photoelectric distance sensors, proximity sensors, ultrasonic sensors, radar, or other types of sensors that may provide outputs used to determine a distance of the robotic device 200 to an object.

The robotic device 200 may also have components or devices that allow the robotic device 200 to interact with an environment (e.g., surrounding or ambient environment). For example, the robotic device 200 may have a camera to provide images of a field of view of the environment as well as mechanical actuators 208, such as motors, wheels, movable arms, etc., that enable the robotic device 200 to move or interact with the environment.

In some example, various sensors and devices on the robotic device 200 may be modules. Different modules may be added or removed from the robotic device 200 depending on requirements. For example, in a low power situation, a robot may have fewer modules to reduce power usages. However, additional sensors may be added as needed. To increase an amount of data a robot may be able to collect, additional sensors may be added, for example.

In some example, the robotic device 200 may be configured to receive a device, such as device 210, that includes the processor 202, the storage 204, and the sensors 206. For example, the robotic device 200 may be a robot that have a number of mechanical actuators (e.g., a movable base), and the robot may be configured to receive a mobile telephone to function as the "brains" or control components of the robot. The device 210 may be considered a module of the robot. The device 210 may be physically attached to the robot or in communication with the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the robotic device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the robotic device 200 may include mechanical robot features, and may be configured to receive the device 210 (e.g., a mobile phone), which can provide additional peripheral components to the robotic device 200, such as any of an accelerometer, gyroscope, compass, GPS, camera, WiFi connection, a touch screen, etc., that are included within the device 210.

Figure 2B:
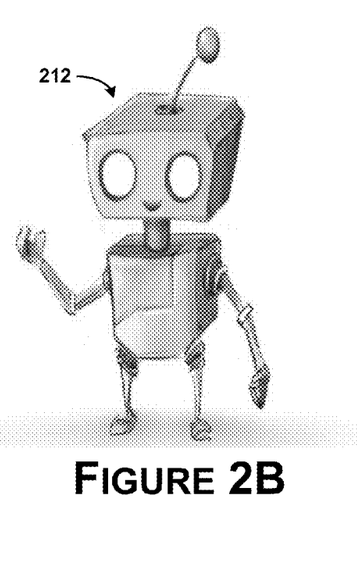

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

Figure 2C:
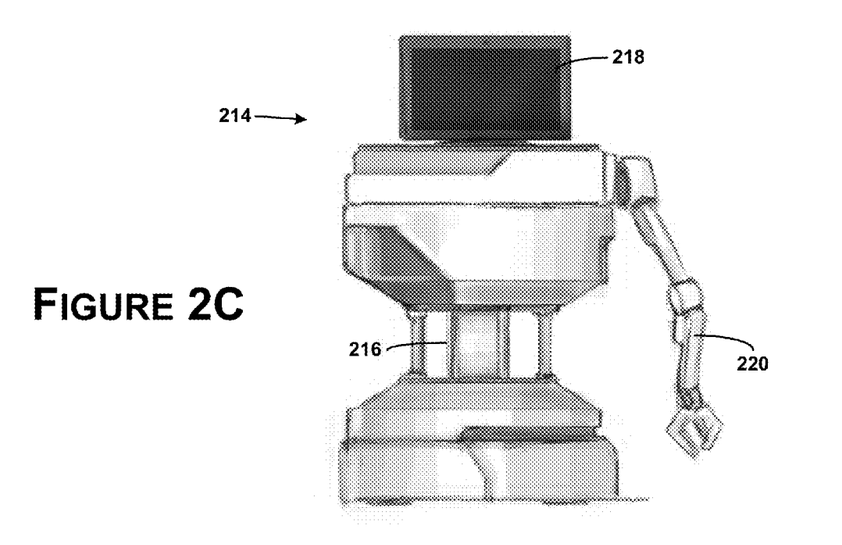

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The sensors 218 may be included within a tablet device, which may also function as the computing device 216. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

Any of the robots illustrated in FIGS. 2A-2C may be configured to operate according to example methods described herein, or according to instructions received from devices that may be configured to operate according to example methods described herein.

Figure 3:
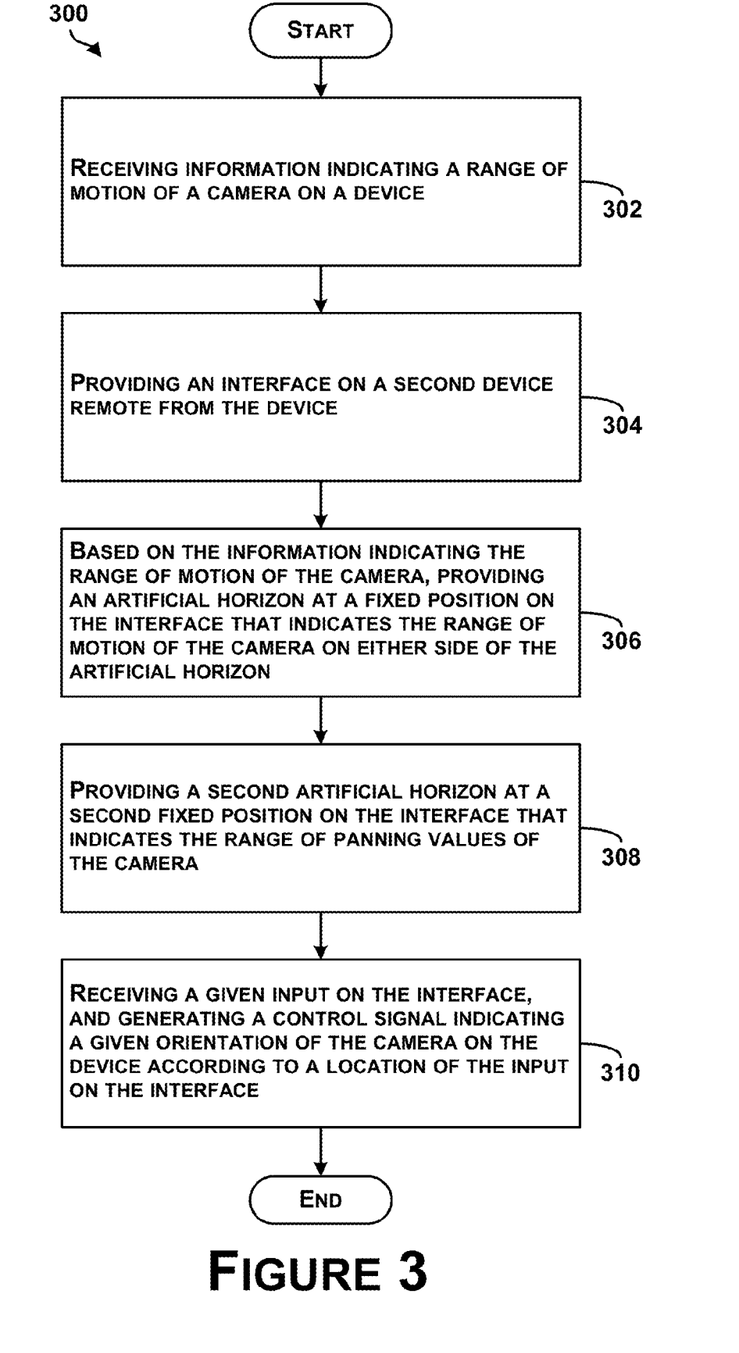
FIG. 3 is a block diagram of an example method of providing functionality of an interface to include an artificial horizon.

FIG. 3 is a block diagram of an example method of providing functionality of an interface to include an artificial horizon. Method 300 shown in FIG. 3 presents an embodiment of a method that, for example, could be used with the system 100, for example, and may be performed by a device, such as any devices illustrated in FIGS. 1-2, or components of the device. Method 300 may include one or more operations, functions, or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

At block 302, the method 300 includes receiving information indicating a range of motion of a camera on a device. The information may be received at a server, at a second device remote from the device, or at the device itself. In examples, a second device may be remote from the device when the second device is not physically coupled to the device. Thus, the second device may be remote from the device, and may also be in proximity to the device or a large distance away from the device. In other examples, the second device may be remote from the device and operationally coupled to the device or in communication with the device.

The information may be received at any time, such as during initialization of the device, or during initialization of the device that receives the information, for example. The information may further be received during initialization of an interface on a given device.

The information may include one or more of a range of tilt values or a range of panning values of the camera. For example, the camera may be mounted on a pan/tilt unit capable of adjusting a pan or a tilt orientation of the camera. Capabilities of the pan/tilt unit may be provided to indicate the range of tilt or pan values of the camera.

At block 304, the method 300 includes providing an interface on a second device remote from the device. The interface may be provided on the device that receives the information at block 302. In some examples, the interface is provided on a device that is remote from the robotic device. The device may be operated to control the robotic device from a remote location. The interface may be configured to receive an input indicating a command for an orientation of the camera on the device. Thus, in some examples, the interface may be a user interface that can receive inputs from a user.

In one example, the interface may be provided on a touchscreen display of a device, and the device may receive an input to the interface via a touch/contact to the touchscreen by a user or stylus. As another example, the interface may include a graphical user interface (GUI) of a device, and the device may receive an input to the interface via an input to a keyboard or mouse coupled to the device. As still another example, the interface may be a general interface to a device, and the device may receive an input via receiving a signal (via a wireless or wired connection) to the interface (e.g., which may take the form of a receiver, a port, etc.). The interface may further be provided via a Web-based interface as well.

The interface may be provided so as to overlay data, such as to overlay a map display or a video/image stream received from the camera. Thus, portions of the interface may be transparent, or semi-transparent. As an example, a video stream from a camera may be provided on a display of a device in a background, and the interface may be provided overlaid onto the video stream in a foreground of the display.

The interface may be configured to indicate or receive a command for an orientation of the camera on a robotic device. Thus, inputs to the interface may be associated with orientations of the camera on the robotic device including directional orientations used to control movement of the camera, and the interface may be configured to associate inputs with corresponding commands that can be used to control operation of the camera and/or the robotic device. The interface may thus take the form of an interface enabling a user to remote control the camera on the robotic device. In some examples, the camera on the robotic device may have a range of motion, and inputs received on the interface can be associated with commands for controlling motion of the camera.

The interface may be configured in a number of ways, and may include a shape (e.g., rectangular shape) configured to overlay an x-y axis. The x-axis can be configured to represent a pan value for the orientation of the camera on the device and the y-axis can be configured to represent a tilt value for the orientation of the camera on the device (other examples include opposite configurations). The command for the orientation of the camera on the device can indicate a fixed orientation of the camera on the device that includes a position of the camera with respect to the device. For instance, the command may indicate to move the camera an amount in a horizontal or vertical direction with respect to a frame of reference of the device (or to capture images, or to generate images with respect to a frame of reference of the robotic device).

Alternatively, the command may indicate a dynamic orientation of the camera on the device that is associated with geographic position coordinates. In this example, the orientation of the camera may be configured with respect to a general frame of reference related to geographic position coordinates. For instance, the device may be configured such that the camera is facing downward due to an orientation of the device (e.g., a robotic device is tilting/leaning forward) and/or due to placement of the camera on the leaning robotic device (e.g., not due to orientation of the camera itself). The command may be indicative of an orientation of the camera taking into account the orientation of the device by using geographic position coordinates.

In some examples, the command indicating panning or tilting of the camera may be performed by maintaining the camera stationary and digitally processing captured images so as to generate digitally processed images from a viewpoint of a camera in an orientation according to the pan/tilt values in the command.

In some examples, the interface may further include an indicator representing a current orientation of the camera on the device, and the interface can change a position of the indicator on the interface corresponding to movement of the camera on the device. The interface may further provide a second indicator representing a location of an input, and that includes a representation or is representative of a command for the orientation of the camera on the device (e.g., based on a configuration of the interface, the second indicator can be representative of the command, such as indicating to pan right/left, tilt up/down, etc.). The second indicator may be provided on the interface at or near the location of the input. In instances in which the interface is provided on a touchscreen, the second indicator may be provided at a location surrounding or adjacent a location of the input. This may enable a user to view the second indicator, since an indicator placed at the location of the input could be placed underneath a user's finger or stylus that provides contact with the touchscreen, and which may block or obstruct a view of an indicator placed at the location of the input. Alternatively, the second indicator may be placed at the location of the input (such as underneath a user's finger on a touchscreen display). Thus, a user may visualize a current orientation of the camera when providing an input to request a change to the orientation of the camera.

In other examples, the interface may also include a first group of indicators on the interface along a perimeter of the interface at locations substantially matching x-axis coordinates of the position of the indicator, and a second group of indicators on the interface along the perimeter of the interface at locations substantially matching y-axis coordinates of the position of the indicator. The perimeter indicators may be useful to visualize a range of motion of the camera. A display of indicators in the first group of indicators and indicators in the second group of indicators can be configured to fade-in or fade-out as the input on the interface changes. An additional indicator may also be positioned at a location of the input, for example.

In other examples, multiple inputs may be received on the interface over time indicating commands for the orientation of the camera on the robotic device, and multiple indicators may be provided on the interface that each are representative of command. For instance, the interface may be presented on a touchscreen and the user may provide an initial input by contacting the touchscreen using a finger, and then slide the finger across the interface to provide multiple inputs. Indicators may be provided to represent locations of some or all received inputs. One or more indicators may represent a previous location of an input on the interface, and one or more indicators may represent a current location of the input on the interface. Further, one or more indicators may represent a future location of a projected future input on the interface.

In further examples, as the multiple inputs on the interface are received over time, a display of one or more of the indicators that represents the previous location of the input on the interface may fade-out over time. In a similar manner, a display of an indicator that represents the future location of the projected future input on the interface may fade-in over time.

The interface may be configured in other manners as well, and may take the form or other geometric shapes or designs based on applications.

At block 306, the method 300 includes based on the information indicating the range of motion of the camera, providing an artificial horizon at a fixed position on the interface that indicates the range of motion of the camera on either side of the artificial horizon. The fixed position of the artificial horizon may be associated with an orientation of the camera having a tilt value of about zero or having a pan value of about zero.

In some examples, the artificial horizon may be associated with an orientation of the camera being substantially parallel to a ground plane. The position of the artificial horizon may be fixed on the interface, and indicators for the camera or inputs may change. The artificial horizon may indicate that the range of motion of the camera on either side of the artificial horizon is unequal such that the camera has a larger range of motion to one side of the artificial horizon. Thus, the artificial horizon may be positioned at positions on the interface other than a center, for example.

In some examples, the artificial horizon may be representative of a plane associated with a field of view of the camera. Thus, the artificial horizon may be specific to the camera, and may be configured according to capabilities of the camera.

The artificial horizon may be provided as a semi-transparent component of the interface. The artificial horizon may overlay a portion of the interface from the fixed position to about a perimeter of the interface, and due to transparency, indicators of the camera or of inputs can be displayed in the artificial horizon.

At block 308, the method 300 may optionally include providing a second artificial horizon at a second fixed position on the interface that indicates the range of panning values of the camera. The second fixed position of the artificial horizon may be associated with an orientation of the camera having a pan value of about zero. In this example, the artificial horizon may indicate a range of tilt values of the camera such that the fixed position of the artificial horizon is associated with the orientation of the camera having the tilt value of about zero, and the second artificial horizon is associated with a panning range of the camera. The artificial horizon and the second artificial horizon may be configured on the interface to be substantially perpendicular.

At block 310, the method 300 may optionally include receiving a given input on the interface, and generating a control signal indicating a given orientation of the camera on the device according to a location of the input on the interface. The location of the input on the interface may be associated with a tilt and/or a pan value of the camera. The remote device may generate the control signal and may provide the control signal to the device.

In further examples, the method 300 may include receiving information indicating movement of the device, and determining changes to the range of motion of the camera on the device. For example, if the device is a robotic device that includes a camera on a portion of the robotic device and the robotic device is leaning forward such that the range of motion of the camera is now restricted, a change to the range of motion can be determined. Based on the changes to the range of motion of the camera on the device, the fixed position of the artificial horizon on the interface can be adjusted in real-time. The range of motion of the camera may be altered or modified due to many reasons including movement of components of the robotic device or a position of the robotic device (e.g., the robotic device may be under a table restricting movement of a camera positioned on top of the robotic device). The changes to the range of motion of the camera may be determined in many ways, such as, by calculating available distances surrounding the camera in an ambient environment using previous and/or current images/video stream of the camera. Information indicating the changes to the range of motion can be calculated by a server or the robotic device and provided to the remote device controlling the robotic device, for example.

In further examples, the method 300 may include providing one or more of an audio or vibration indicator that is indicative of repositioning the indicator on the interface to be at the pre-set location. The audio or vibration signal may provide feedback to a user indicating that the change on the interface has been made.

In still further examples, the method 300 may include providing on the interface text that indicates the command for the orientation of the camera on the robotic device. The text may provide further feedback to the user indicating the command that corresponds to a received input.

The method 300 may be performed by a second device remote from the device to control operation of a device (e.g., to control operation of a robotic device). The second device may include a processor and memory including instructions stored therein executable by the processor to perform functions of the method 300. The second device may be remote from the robotic device, and may send signals (either via a wired or wireless connection) to the robotic device. Thus, the interface may be provided by or on the second device. The second device may include a touchscreen display configured to receive the input on the interface (e.g., via a contact with the touchscreen), and based on the input, the second device may be configured to generate a control signal for the command for the orientation of the camera on the robotic device. The second device may subsequently provide the control signal to the robotic device. The method 300 may be performed to operate any type of robotic device, including robotic devices that may be configured to turn in place or not, that may be stationary or mobile, or that may have other functionality or limitations. The method 300 may further include receiving a double-tap or double-click input on an interface, and generating a control signal indicating the orientation of the camera on the robotic device to be reset to a default orientation (e.g., facing forward).

Figure 4A:
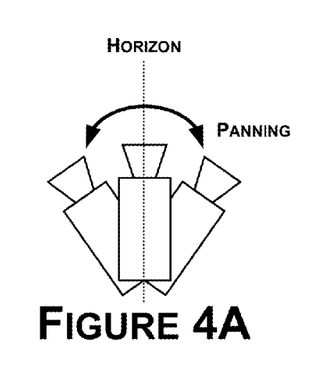
FIGS. 4A-4B are conceptual illustrations of example orientations of a camera on a device.
Figure 4B:
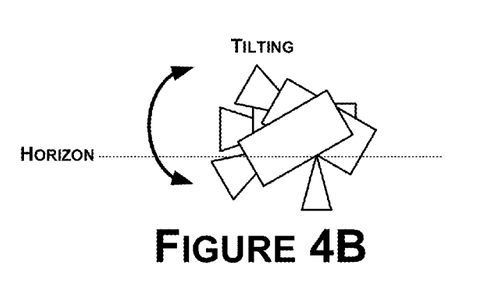
Figure 5A:
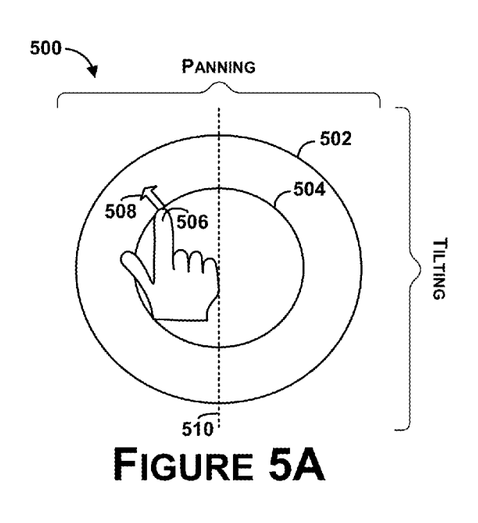
FIGS. 5A-5B are example illustrations of an interface to receive inputs to control orientations or the camera on the device.
Figure 5B:
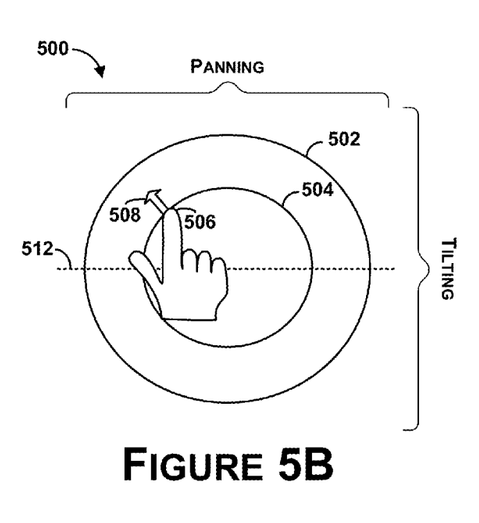

FIGS. 4A-4B are conceptual illustrations of example orientations of a camera on a device, and FIGS. 5A-5B are example illustrations of an interface 500 to receive inputs to control the orientations. FIG. 4A illustrates an example birdseye view of a camera. In FIG. 4A, a camera may be controlled to move about a pivot point in a horizontal direction so as to pan the camera from left to right. For example, the camera may be mounted on a pan/tilt unit that can receive commands indicating directions to move the camera. The panning may include horizontal movement or rotation of the camera (e.g., still or video camera), or scanning of a subject horizontally on video or a display device. The camera may be configured to pan in any amount (such as in the range of 0 degrees to 360 degrees). FIG. 4B illustrates an example side-view of a camera. In FIG. 4B, the camera may be controlled to move about a pivot point in a vertical direction so as to tilt the camera up and down. The camera may be configured to tilt in any amount (such as in the range of 0 degrees to 360 degrees). In some examples, panning or tilting of the camera may be performed by maintaining the camera stationary and digitally processing captured images.

FIGS. 5A-5B are example illustrations of an interface 500. The interface 500 may be provided on a display of a device, and may be configured to receive inputs and correlate the inputs to commands for an orientation of the camera on a robotic device that is remote from the device.

The interface 500 is shown to include two concentric circles 502 and 504 that may be representative of a range of motion of the camera on the robotic device, or a range of orientation of the camera. An input on the interface 500 may be associated with coordinates on an x-y axis, and the x-axis may correspond to values for the panning of the camera and the y-axis may correspond to values for the tilting of the camera.

The interface 500 may receive an input from a user's finger or from a stylus at a location 506. The interface 500 may be configured to provide an indicator 508 at a location representing the location of the received input. As shown in FIG. 5A, the interface 500 may be configured to be provided on a touchscreen, and a user may provide an input at the location 506. The indicator 508 is provided adjacent the location 506 so as to represent the input. In this way, a user may view the indicator 508, rather than providing the indicator exactly at the location 506 in which the indicator 508 would be provided underneath the user's finger. In alternative examples, the indicator 508 may be provided at the location 508 and may be of a size such that a user can view the indicator 508.

The example interface 500 is shown to further include an artificial horizon 510 illustrated at a center position or illustrated dividing the interface 500 down the middle. The artificial horizon 510 may be associated with an orientation of the camera having a pan value of zero. In this example, in FIG. 4A, the camera is shown to include an equal amount of panning available to a left and a right, such that a pan value of zero is at a center. Thus, in the interface 500 in FIG. 5A, the artificial horizon 510 is shown as a center line of the interface along the y-axis.

The interface 500 may further include an artificial horizon 512, as shown in FIG. 5B, to correspond to a horizon for the tilting values of the camera. In this example, in FIG. 4B, the camera is shown to have an equal (or about equal) amount of tilting available up and down, such that a tilt value of zero is at a center. Thus, in the interface 500 in FIG. 5B, the artificial horizon 512 is shown as a center line of the interface along the x-axis.

Figure 6:
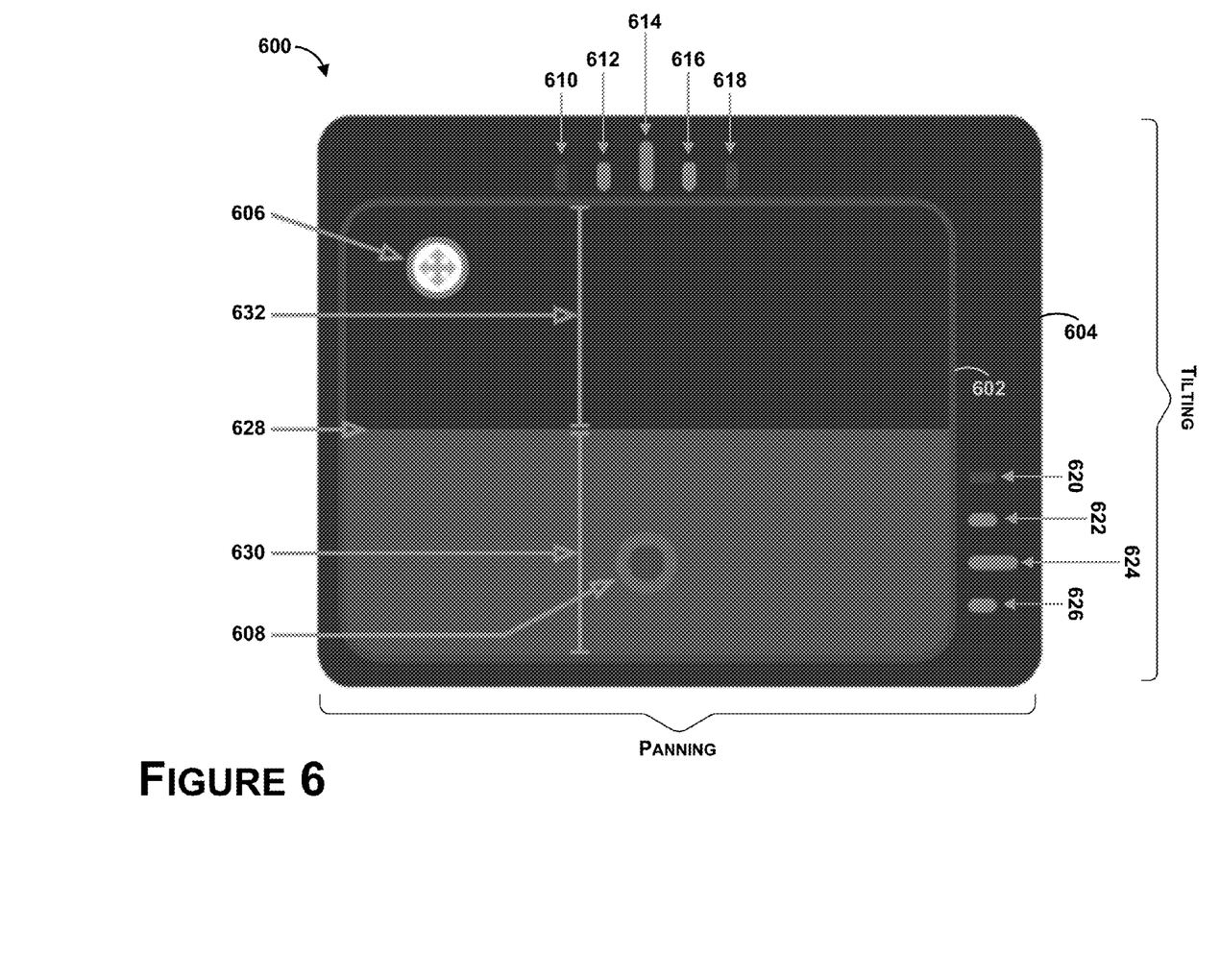
FIG. 6 is another example interface.

FIG. 6 is another example interface 600. The interface 600 is shown to be a substantially rectangular shape, and may include as structure two rectangles 602 and 604. The interface 600 may receive an input 606 at any location within the rectangle 602. The input 606 may be associated with pan and tilt values of a camera on a robotic device. The interface 600 may be associated with an x-y axis such that an x-axis coordinate of the input 606 is associated with a pan value, and a y-axis coordinate of the input 606 is associated with a tilt value. The interface 600 may be configured to provide an indicator (shown as a circle enclosing arrows) at a location of the input 606.

The interface 600 may further include an indicator 608 representing a current orientation of the camera. The indicator 608 may represent current pan/tilt values of the camera on the robotic device to provide feedback to the user. A position of the indicator 608 on the interface 600 may be adjusted as inputs are received due to movement of the camera, for example.

The interface 606 may be further configured to provide additional indicators that are representative of the current orientation of the camera. As shown, indicators 610, 612, 614, 616, and 618 may be provided along a perimeter of the rectangle 602 at x-axis coordinates that substantially match an x-axis coordinate of the camera indicator 608. Similarly, the indicators 620, 622, 624, and 626 may be provided along a perimeter of the rectangle 602 at y-axis coordinates that substantially match an x-axis coordinate of the camera indicator 608.

The groups of indicators along the x-axis and y-axis perimeter of the rectangle 602 may alternatively be provided at x and y axis coordinates that substantially match the indicator 606 associated with an input, for example. Groups of indicators provided at x and y axis coordinates that substantially match the indicator 606 associated with an input could be provided (or displayed) at times when an input is being provided.

The interface 600 further includes an artificial horizon 628 provided at a position that indicates a zero tilt value of the camera (e.g., indicates a plane parallel to ground with respect to the camera). A range of motion 630 of the camera below the artificial horizon 628 and a range of motion 632 of the camera above the artificial horizon 628 is shown in FIG. 6. In FIG. 6, the range of vertical motion of the camera is about equal above and below the ground plane, and thus, the artificial horizon 628 is provided at about center of the interface 600.

Figure 7:
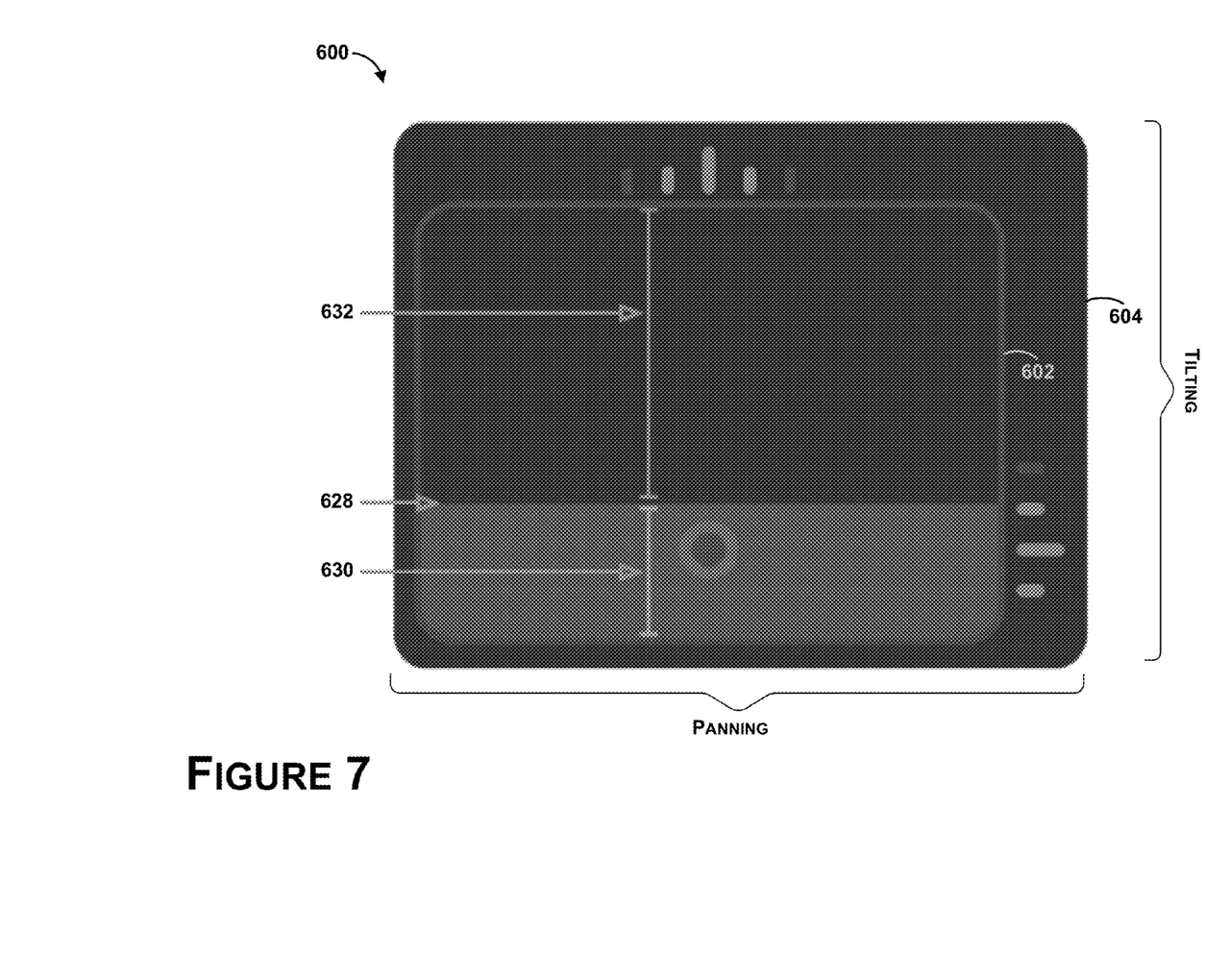
FIG. 7 illustrates still another example of the interface.

FIG. 7 illustrates an example of the interface 600 in which the artificial horizon 628 is shown to be lower than that in FIG. 6. In the example in FIG. 7, the range of motion of the camera is less with respect to motion below the artificial horizon 628 than with respect to motion above the artificial horizon 628. Thus, the camera may tilt upward more degrees than the camera may tilt downward in this example.

Figure 8:
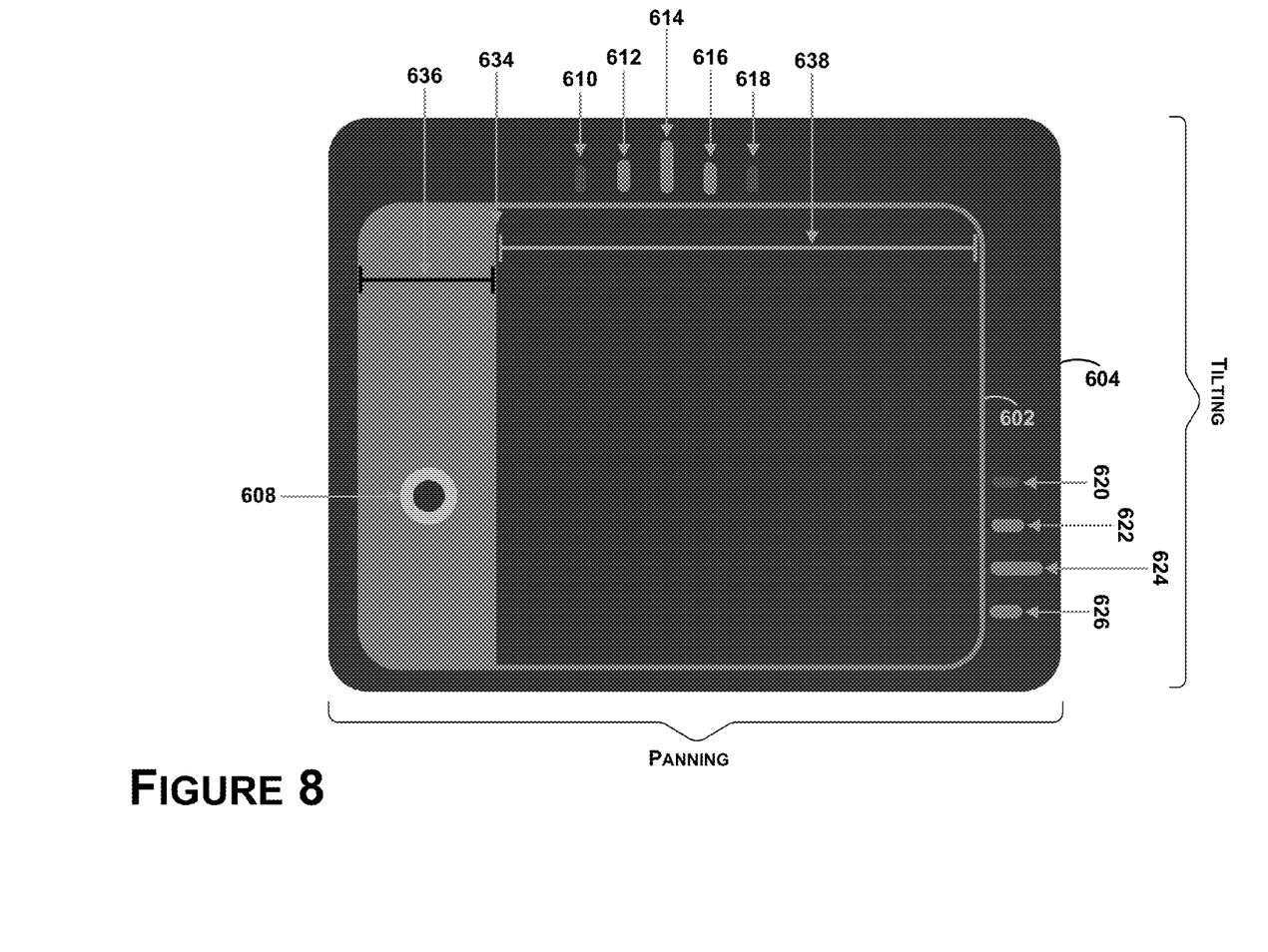
FIG. 8 illustrates another example of the interface in FIG. 6 including an artificial horizon that represents an orientation of the camera having a pan value of about zero.

FIG. 8 illustrates another example of the interface 600 including an artificial horizon 634 that represents an orientation of the camera having a pan value of about zero. A range of motion to the left 636 for the camera is shown, as well as a range of motion to the right 638 for the camera. In this example, the camera may pan to the right in more degrees than the camera may pan to the left.

Figure 9:
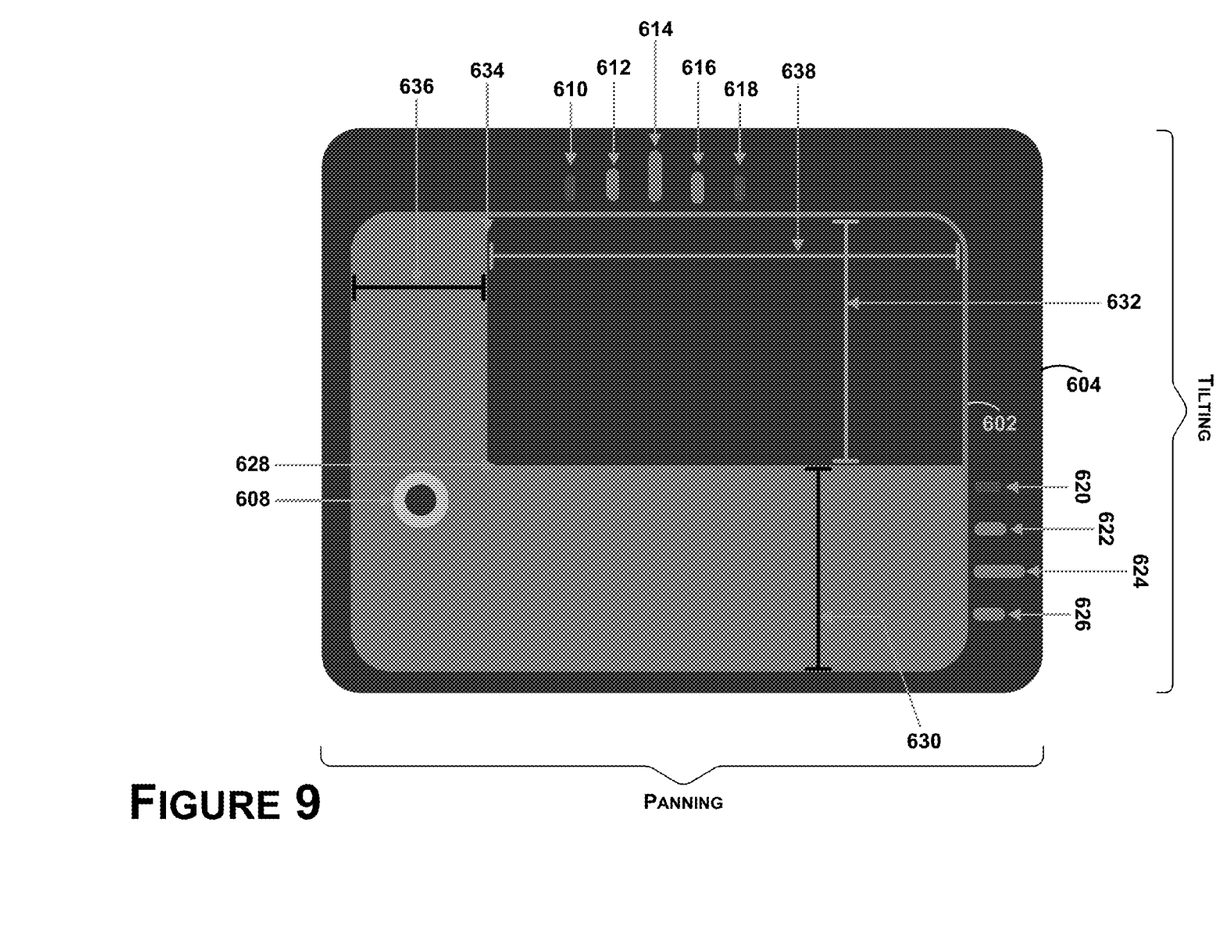
FIG. 9 illustrates still another example of the interface in FIG. 6 including both horizontal and vertical artificial horizons.

FIG. 9 illustrates still another example of the interface 600 including both the horizontal and vertical artificial horizons 628 and 634 as shown in FIG. 6 and FIG. 8. In the example shown in FIG. 9, a portion of the artificial horizon 628 and the artificial horizon 634 may overlap to indicate a range of motion of the camera include both pan and tilt range.

In examples, using the interface 600, a user may be able to determine a pan/tilt of the camera relative to the ground. The fixed position of the artificial horizon indicates an amount of available motion, and is useful in instances in which a pan/tilt unit does not tilt a same amount above and below 0 degrees, for example. Thus, a display of the artificial horizon illustrates a level for 0 degrees, which may not be a center of the interface 600.

As an example, a pan/tilt unit may be capable of tilting upward 25 degrees and downward 75 degrees. In this example, the artificial horizon would be provided on the interface 600 at a position about 25% from a top of the interface 600. In another example, a pan/tilt unit may be capable of tilting upward 50 degrees and downward 50 degrees, and in this example, the artificial horizon would be provided on the interface 600 at about a center of the interface 600.

As described, as the device upon which the camera is mounted moves, a range of motion of the camera may change, and the position of the artificial horizon on the interface 600 can be adjusted accordingly. As an example, the camera may be provided on a right shoulder of a robotic device (e.g., the robotic device 212 in FIG. 2), and the pan/tilt unit of the camera may be capable of panning a few degrees to the left (due to interference with a head of the robotic device 212) and a large amount of degrees to the right (e.g., such as to rotate about the shoulder and to provide a rear view of the robotic device 212). In an example in which the robotic device 212 raises a right arm, the right arm may then obstruct or interfere with movement of the camera to the right, in which case the range of motion of the camera may change. A new range of motion may be provided to the interface, and a position of the artificial horizon on the interface can be adjusted. The range of motion of the camera can be determined in real-time, and the position of the artificial horizon can also be adjusted in real-time.

In another example, a camera may be provided on a head of a robotic device (e.g., the robotic device 212 in FIG. 2), and may include a range of motion that can be illustrated by the artificial horizon on the interface 600. The head of the robotic device may also be capable of rotating, which also provides a further range of motion of the camera. Thus, the range of motion of the camera may also take into account a range of motion of a base or component of the device upon which the camera is mounted (in addition to a pan/tilt unit of the camera).

In examples herein, interfaces are provided that may be configured to both receive inputs as well as provide outputs (e.g., touchscreen displays). For instance, an interface may be provided on a handheld computer that can receive an input and provide a display representative of the output.

In other examples, interfaces may be provided that are configured to receive inputs, and outputs may be provided by other devices. For instance, a motion-detection device may be configured to receive an input and to provide the input to a display device which displays an output representative of the input. The motion-detection device may include a camera, a depth sensor, microphones, etc., and may be configured to provide motion capture, facial recognition, and voice recognition capabilities. The depth sensor may be configured to include an infrared laser projector and a monochrome CMOS sensor that can capture video data in 3D under ambient light conditions. The motion-detection device may be configured to provide an interface using the infrared laser projector, for example, to receive inputs from users. The inputs can be associated with indicating a command for an orientation of the camera on a device that is remote from the motion-detection device. The interface may be viewable by a user, such as a laser projected interface, or may be a conceptual interface in which inputs are received due to motion of the user and the interface is not visible to the user.

The motion-detection device may be coupled to a display device, and may provide outputs to the display device. The motion-detection device may generate a display representative of the interface or representative of inputs to the interface, and provide the display to the display device (or may provide information associated with the inputs to the display device and the display device can generate the display). The display may include an indicator representing a location of a received input, and the indicator may be representative of the command for the orientation of the camera on the device. The location of the received input can be associated with a physical or geographic location, or can be associated with a location on the display representative of the interface that maps to the location of the received input. For instance, a user may provide an input to the interface provided by the motion-detection device at a physical location, and the physical location can be mapped to a position on a display representative of the interface.

The motion-detection device or the display device may further be configured to providing an artificial horizon at a fixed position on the interface that indicates a range of motion of the camera on either side of the artificial horizon.

Thus, in some examples, a first device may be configured to receive an input at an interface that may be provided by or on the first device, and a second device different from the first device may be configured to provide an output based on the input. As a specific example, a motion-detection device may receive an input, and an output can be provided on a display device coupled (either wired or wirelessly) to the motion-detection device. As another example, a user may provide an input on a device (e.g., a keyboard, mobile phone, computing device, etc.) that is coupled to a separate device (e.g., a display) on which an output is provided.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving information indicating a range of motion of a camera on a device,
    providing an interface on a second device remote from the device, wherein the interface is configured to receive an input indicating a command for an orientation of the camera on the device;
    based on the information indicating the range of motion of the camera, providing an artificial horizon at a position on the interface that indicates the range of motion of the camera on either side of the artificial horizon, wherein the position of the artificial horizon is associated with an orientation of the camera having a tilt value of about zero or having a pan value of about zero with respect to a plane associated with a field of view of the camera;
    receiving information indicating a change to the range of motion of the camera on the device; and
    based on the information indicating the change to the range of motion of the camera, updating the position of the artificial horizon to a different position on the interface, wherein the different position of the artificial horizon is associated with the orientation of the camera having the tilt value of about zero or having the pan value of about zero with respect to the plane associated with the field of view of the camera.

2. The method of claim 1, further comprising receiving the information indicating the range of motion of the camera on the device during initialization of the interface.

3. The method of claim 1, wherein the information indicating the range of motion of the camera on the device is indicative of one or more of a range of tilt values or a range of panning values of the camera.

4. The method of claim 1, wherein the camera is mounted on a pan/tilt unit capable of adjusting a pan or a tilt orientation of the camera.

5. The method of claim 1, wherein the artificial horizon is associated with an orientation of the camera being substantially parallel to a ground plane.

6. The method of claim 1, wherein the position of the artificial horizon on the interface indicates that the range of motion of the camera on either side of the artificial horizon is unequal such that the camera has a larger range of motion to one side of the artificial horizon.

7. The method of claim 1, wherein the interface is provided on a touchscreen on the second device, and the touchscreen is configured to receive the input indicating the command for the orientation of the camera on the device.

8. The method of claim 1, further comprising:
    receiving a given input on the interface; and
    generating a control signal indicating a given orientation of the camera on the device according to a location of the input on the interface, wherein the location of the input on the interface is associated with one or more of a tilt and a pan value of the camera.

9. The method of claim 1, further comprising:
    receiving information indicating movement of the device;
    determining the change to the range of motion of the camera on the device based on the information indicating movement of the device.

10. The method of claim 1, further comprising:
    providing on the interface an indicator representing a current orientation of the camera on the device, wherein the interface is configured to change a position of the indicator on the interface corresponding to movement of the camera on the device; and
    providing on the interface a second indicator representing a location of the input.

11. The method of claim 10, wherein the interface includes a rectangular shape configured to overlay an x-y axis, and the method further comprises:
    providing a first group of indicators on the interface along a perimeter of the rectangular shape at locations substantially matching x-axis coordinates of the position of the indicator; and providing a second group of indicators on the interface along the perimeter of the rectangular shape at locations substantially matching y-axis coordinates of the position of the indicator.

12. The method of claim 1, wherein the artificial horizon is semi-transparent.

13. The method of claim 1, wherein the artificial horizon is provided on the interface and extends from the position of the artificial horizon to about a perimeter of the interface.

14. The method of claim 1, wherein the interface includes a shape configured to overlay an x-y axis, and wherein the x-axis is configured to represent a pan value for the orientation of the camera on the device and the y-axis is configured to represent a tilt value for the orientation of the camera on the device.

15. The method of claim 1, wherein receiving information indicating the range of motion of the camera on the device comprises receiving information indicating a range of tilt values and a range of panning values of the camera, and the method further comprises:
- providing the artificial horizon at the position on the interface that indicates the range of tilt values of the camera, wherein the position of the artificial horizon is associated with the orientation of the camera having the tilt value of about zero; and
- providing a second artificial horizon at a second position on the interface that indicates the range of panning values of the camera, wherein the second position of the artificial horizon is associated with an orientation of the camera having the pan value of about zero,
- wherein the artificial horizon and the second artificial horizon are configured on the interface to be substantially perpendicular.

16. A non-transitory computer readable medium having stored thereon instructions executable by a computing device to cause the computing device to perform functions comprising:
- receiving information indicating a range of motion of a camera on a device;
- providing an interface on the computing device, wherein the interface is configured to receive an input indicating a command for an orientation of the camera on the device;
- based on the information indicating the range of motion of the camera, providing an artificial horizon at a position on the interface that indicates the range of motion of the camera on either side of the artificial horizon, wherein the position of the artificial horizon is associated with an orientation of the camera having a tilt value of about zero or having a pan value of about zero with respect to a plane associated with a field of view of the camera;
- receiving information indicating a change to the range of motion of the camera on the device; and
- based on the information indicating the change to the range of motion of the camera, updating the position of the artificial horizon to a different position on the interface, wherein the different position of the artificial horizon is associated with the orientation of the camera having the tilt value of about zero or having the pan value of about zero with respect to the plane associated with the field of view of the camera.

17. The non-transitory computer readable medium of claim 16, further comprising
- instructions executable by the computing device to cause the computing device to perform functions comprising:
- providing on the interface an indicator representing a current orientation of the camera on the device, wherein the interface is configured to change a position of the indicator on the interface corresponding to movement of the camera on the device; and
- providing on the interface an indicator representing a location of the input.

18. A device comprising:
- a processor; and
- memory including instructions stored therein executable by the processor to perform functions comprising:
- receiving information indicating a range of motion of a camera on a device;
- providing an interface, wherein the interface is configured to receive an input indicating a command for an orientation of the camera on the device;
- based on the information indicating the range of motion of the camera, providing an artificial horizon at a position on the interface that indicates the range of motion of the camera on either side of the artificial horizon, wherein the position of the artificial horizon is associated with an orientation of the camera having a tilt value of about zero or having a pan value of about zero with respect to a plane associated with a field of view of the camera;
- receiving information indicating a change to the range of motion of the camera on the device; and
- based on the information indicating the change to the range of motion of the camera, updating the position of the artificial horizon to a different position on the interface, wherein the different position of the artificial horizon is associated with the orientation of the camera having the tilt value of about zero or having the pan value of about zero with respect to the plane associated with the field of view of the camera.

19. The device of claim 18, wherein the interface includes a shape configured to overlay an x-y axis, and wherein the x-axis is configured to represent a pan value for the orientation of the camera on the device and the y-axis is configured to represent a tilt value for the orientation of the camera on the device, and
- wherein the artificial horizon overlays a portion of the interface from the position of the artificial horizon to about a perimeter of the interface.

\* \* \* \* \*